(12) United States Patent
Wiseman et al.

(10) Patent No.: US 9,325,669 B2
(45) Date of Patent: Apr. 26, 2016

(54) NETWORK SECURITY CONTENT CHECKING

(75) Inventors: Simon Robert Wiseman, Worcestershire (GB); Richard Andrew Oak, Worcestershire (GB)

(73) Assignee: QINETIQ LIMITED (GB)

( * ) Notice: Subject to any disclaimer, the term of this patent is extended or adjusted under 35 U.S.C. 154(b) by 0 days.

(21) Appl. No.: 13/700,216

(22) PCT Filed: May 19, 2011

(86) PCT No.: PCT/GB2011/000761
§ 371 (c)(1),
(2), (4) Date: Nov. 27, 2012

(87) PCT Pub. No.: WO2011/148123
PCT Pub. Date: Dec. 1, 2011

(65) Prior Publication Data
US 2013/0073843 A1 Mar. 21, 2013

(30) Foreign Application Priority Data
May 27, 2010 (GB) .................................. 1008888.8

(51) Int. Cl.
*G06F 21/85* (2013.01)
*H04L 29/06* (2006.01)

(52) U.S. Cl.
CPC ............ *H04L 63/0428* (2013.01); *G06F 21/85* (2013.01); *H04L 63/0245* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 5,991,401 A * | 11/1999 | Daniels et al. | ................ | 713/168 |
| 6,061,794 A * | 5/2000 | Angelo et al. | ..................... | 726/3 |
| 7,236,455 B1 * | 6/2007 | Proudler et al. | ............. | 370/230 |
| 7,246,140 B2 * | 7/2007 | Therrien et al. | | |
| 7,398,400 B2 * | 7/2008 | Wiseman | ....................... | 713/188 |
| 7,650,497 B2 * | 1/2010 | Thornton et al. | ............. | 713/158 |
| 7,783,880 B2 * | 8/2010 | Pinkerton et al. | ............. | 713/151 |
| 8,037,520 B2 * | 10/2011 | Wiseman et al. | ................ | 726/14 |
| 8,566,580 B2 * | 10/2013 | Ben-Itzhak et al. | .......... | 713/156 |
| 8,621,627 B1 * | 12/2013 | Eiriksson et al. | ................ | 726/23 |
| 2003/0041110 A1 * | 2/2003 | Wenocur et al. | .............. | 709/206 |
| 2004/0193871 A1 * | 9/2004 | Seshadri | ....................... | 713/154 |
| 2005/0154871 A1 | 7/2005 | Lin et al. | | |
| 2005/0256975 A1 * | 11/2005 | Kaniz et al. | .................... | 709/250 |
| 2006/0129811 A1 * | 6/2006 | Fiske | ............................ | 713/167 |
| 2007/0245415 A1 * | 10/2007 | Wiseman | ........................ | 726/14 |
| 2008/0022094 A1 | 1/2008 | Gupta et al. | | |
| 2008/0065892 A1 * | 3/2008 | Bailey et al. | ................... | 713/171 |
| 2008/0091857 A1 | 4/2008 | McDaniel | | |
| 2008/0148060 A1 | 6/2008 | Thorel et al. | | |
| 2008/0151110 A1 * | 6/2008 | Hasegawa et al. | ............ | 348/466 |
| 2008/0181414 A1 * | 7/2008 | Deaver et al. | ................. | 380/279 |

(Continued)

FOREIGN PATENT DOCUMENTS

| WO | WO 02/095543 | 11/2002 | | |
|---|---|---|---|---|
| WO | WO 2007/031744 | 3/2007 | | |
| WO | WO 2007031744 A1 * | 3/2007 | ............. | H04L 29/06 |

*Primary Examiner* — Hadi Armouche
*Assistant Examiner* — Malcolm Cribbbs
(74) *Attorney, Agent, or Firm* — McDonnell Boehnen Hulbert & Berghoff LLP (57) ABSTRACT

Methods, apparatus, and programs for a computer for network security content checking: in particular ones which simplify the critical element of a content checker so it can be trusted and implemented in logic.

13 Claims, 5 Drawing Sheets

(56) References Cited

U.S. PATENT DOCUMENTS

| | | | |
|---|---|---|---|
| 2008/0307217 A1* | 12/2008 | Yukimatsu et al. | 713/150 |
| 2008/0307219 A1* | 12/2008 | Karandikar | 713/153 |
| 2009/0132823 A1* | 5/2009 | Grimen et al. | 713/171 |
| 2009/0204824 A1* | 8/2009 | Lin et al. | 713/193 |
| 2010/0049978 A1* | 2/2010 | Ogawa et al. | 713/170 |
| 2011/0246783 A1* | 10/2011 | Unagami et al. | 713/187 |
| 2012/0166582 A1* | 6/2012 | Binder | 709/217 |
| 2012/0226914 A1* | 9/2012 | Wiseman et al. | 713/189 |
| 2012/0226917 A1* | 9/2012 | Wiseman et al. | 713/193 |

* cited by examiner

NETWORK SECURITY CONTENT CHECKING

FIELD OF THE INVENTION

The present invention relates to apparatus, methods, signals, and programs for a computer for network security and systems incorporating the same.

BACKGROUND TO THE INVENTION

Computer applications often malfunction in damaging ways when they handle data containing unusual or malformed constructs. For example, many old versions of applications that handle JPEG images would erroneously execute some of the image file's data as code if a comment block in the JPEG image had an invalid length. Consequently the applications were vulnerable to attack by someone who placed damaging code in such a malformed file.

Computer applications often include more information in the data files they construct than is apparent to the user of the application. For example, Microsoft Word 97 has a feature whereby it may retain deleted text in a file to avoid the delay that would occur if the file were re-written to exclude deletions. Consequently, documents created by such applications may contain sensitive data that should not be disclosed and yet can be recovered by examining the data file using a different application, leading to leaks of sensitive information.

As a result of the risks of damage caused by data files received by a sensitive system and the risks of leaks caused by data files released from a sensitive system, it is normal practice to apply checks to data entering and leaving a sensitive system. These content checks examine the data for constructs that might cause damage or may leak information, blocking the data from passing if it has such undesirable content. Examples of this practice can be found in the many Anti-Virus and Data Leakage Protection products on the market, such as those from Sophos and Symantec.

In particularly sensitive systems, a secondary risk becomes important: a failure of some system component may cause data to enter or leave the system without being inspected by the content checkers. As a result, the sensitive system may be damaged by data that causes applications to malfunction or sensitive information may leak out.

Patent application WO 2007/031744 A1 "Communication System Firewall" discloses a method for delivering data to and from a software content checker, which is hosted on a dedicated computer, that mitigates this risk.

The data is carried in a format chosen to be invalid with respect to any other software or peripheral firmware which might receive it in error but nevertheless interpretable by the content checker. If some failure were to cause the data to be delivered to software or firmware other than the content checker, it will be delivered in an invalid format and hence be discarded. This avoids the possibility of such a failure leading to data being passed through the system without being checked.

This enforces the constraint that only data in the selected format enters or leaves the system. Data not in the correct format is discarded and so cannot cause any damage.

This gives good assurance that an attacker is unable to send carefully crafted data to the content checker host computer in order to cause it to malfunction, resulting in unchecked data being passed. It also assures that a component failure in the content checker host computer will not cause data containing sensitive data to be released without the content checkers having the opportunity to block the leak.

Figure 1:
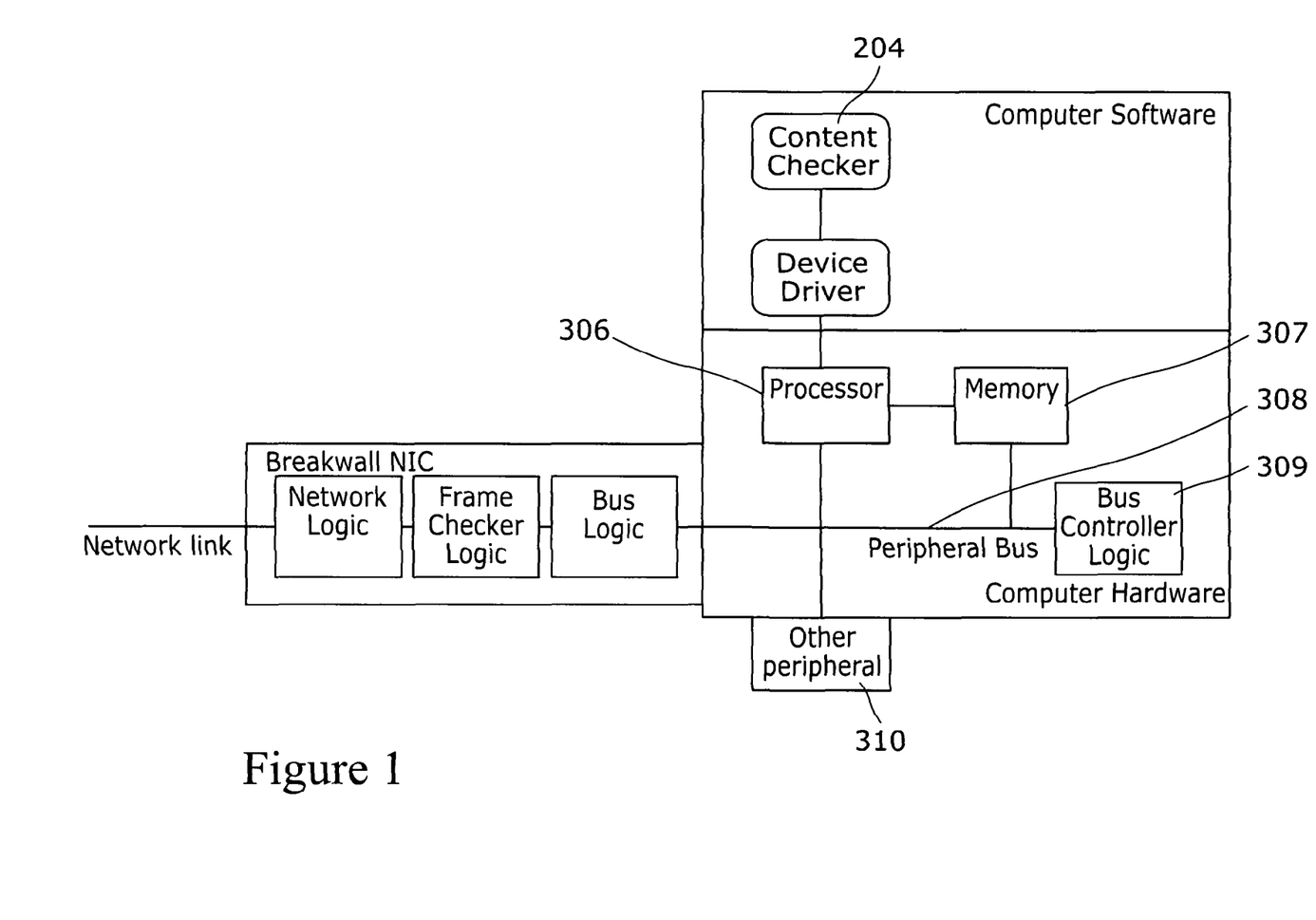
FIG. 1 shows a schematic diagram of a first firewall system.

Referring to FIG. 1, the computer hardware connects to its peripherals, including the BreakWall Network Interface Card NIC, via a peripheral bus (e.g. a PCI bus). This is controlled by the bus controller logic, which arbitrates between the different peripherals that contend for the services provided by the bus. The computer's processor connects to the peripheral bus, allowing the computer to communicate with the peripherals, and the computer's memory is also connected to allow peripherals to transfer data at high-speed by direct memory access.

The BreakWall Network Interface Card (NIC) connects the network link (e.g. an Ethernet fibre) to the checker computer's peripheral bus. The NIC contains three logic sub-systems: the network logic drives the network link, receiving frames of data from it and passing frames of data to it; the bus logic drives the peripheral bus, exchanging data with the device driver directly under processor command, or indirectly through the computer's main memory by the use of direct memory access (DMA); and the frame checker logic ensures that only data framed in the expected way is allowed to pass between the network link and the computer.

The frame format that such systems allows to pass is selected carefully so that should the bus controller logic or other peripherals malfunction and cause the data to be delivered to any component other than the content checker, the data is not intelligible to them and it is discarded.

OBJECT OF THE INVENTION

The invention seeks to provide an alternative or improved method, apparatus, and programs for a computer for content checking, in particular ones which simplify the critical element of a content checker so it can be trusted and implemented in logic.

SUMMARY OF THE INVENTION

The present inventors have identified that there are failure modes which could potentially lead to data passing through the content checker system without being checked. Consequently in some critical circumstances it may not be considered to provide adequate assurance that attacks and leaks will not occur.

In particular, while a frame passed through such a BreakWall system into the computer may be unintelligible to the other peripherals, some portion of the payload data contained in a frame could be valid. This gives rise to a failure mode whereby part of a frame is mis-delivered to another peripheral could result in unchecked data being passed.

For example, if an IP packet is contained as the payload data in a BreakWall frame and some fault causes only the payload portion of the frame to be transferred to a standard network card peripheral, this peripheral will interpret the data and send it out to another network without it passing through the content checker.

In particular, according to a first aspect of the present invention there is provided a method of ensuring content checking of transmitted data, the method comprising the steps of: applying an encryption method to data transmitted in at least one direction between a network interface card and a content checker.

Hence if the data or a subset of it is mis-delivered the receiving component will find it unintelligible—since it is encrypted—and discard it. Although encryption techniques are well known, they are generally considered to provide protection against the disclosure of sensitive data. However encryption is used in the present context to protect functional components from damage which might be caused by their accessing potentially malformed data before the data can be checked to determined that it is not malformed and hence will not be damaging.

The encryption method may employ a key agreement protocol to establish encryption key values.

The key agreement protocol may be chosen such that even if the protocol messages are observed they cannot be used to determine the key.

The key agreement protocol may use a Diffie-Hellman algorithm.

The encryption method may use a symmetric encryption method.

The encryption method may use XOR encryption.

The encryption method may use an asymmetric encryption method.

Content checking may be applied to data transmitted in both directions.

Distinct cryptographic keys may use used for the two directions of transmission.

Distinct cryptographic methods may use employed for the two directions of transmission.

The asymmetric key pair may use generated in one of the network interface card and a device driver for the content checker and the scrambling key forwarded to the other of the network interface card and the device driver for the content checker whilst retaining the other as the unscrambling key.

At least one of the network interface card and the device driver for the content checker may be loaded with a cryptographic identity for use in authenticating a shared encryption key.

The invention also provides for a system for the purposes of communications which comprises one or more instances of apparatus embodying the present invention, together with other additional apparatus.

The invention also provides for computer software in a machine-readable form and arranged, in operation, to carry out every function of the apparatus and/or methods.

The invention is also directed to signals employed by the other aspects of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 2:
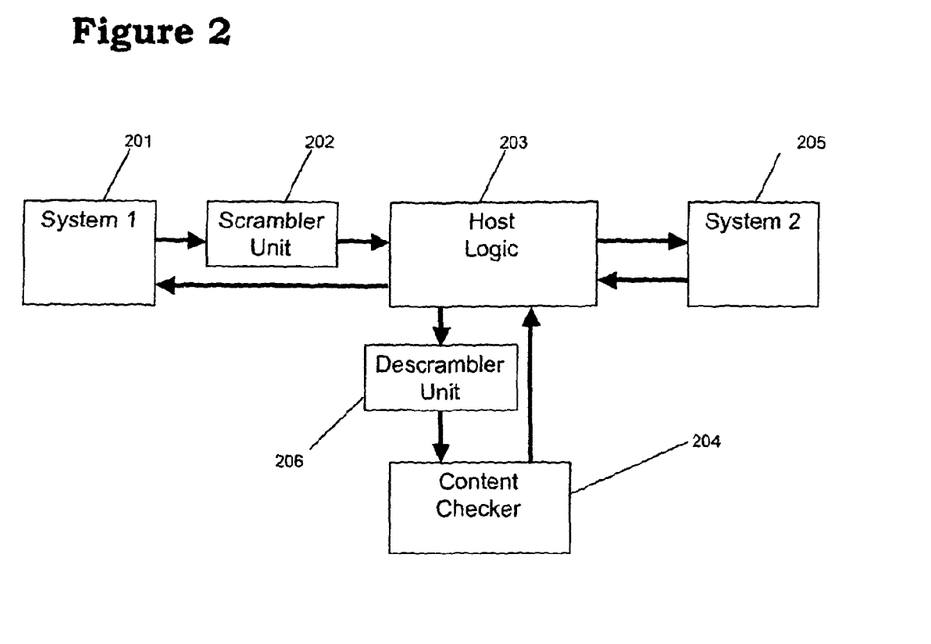
FIG. 2 shows a schematic diagram of a second firewall system in accordance with the present invention.

Referring now to FIG. 2, a first embodiment comprises two separate computer systems, (201) and (205), that are linked by a content checking device (204) that is supported by some host logic (203) that might be the hardware logic, firmware or software of a computer system that hosts the content checker.

A scrambler unit (202) is placed between the first system and the host logic and a descrambler unit (206) is placed between the host logic (203) and the content checker (204).

The various components are arranged so that data can flow from the first system to the second system and from the second system to the first system, but each of the flows takes slightly different paths.

Data from the first system (201) to the second system (205) is passed first to the scrambler unit (202). The scrambler unit scrambles the data and then passes it to the host logic (203), which should pass it to the content checker (204). If the host logic malfunctions and processes the data in some other way it is assumed that the scrambling has rendered it unintelligible and so it is discarded. If the data reaches the descrambler unit (206), that component unscrambles the data and then passes it to the content checker (204) which checks it meets the conditions for passing to the second system. If the conditions are met the data is delivered to the second system via the host logic (203). If the conditions are not met the data is discarded.

Data from the second system (205) to the first system (201) is passed first to the content checker (204) via the host logic (203). The content checker applies checks to it. If the checks pass the data is sent via the host logic (203) to the first system. It does not pass through the descrambler unit (206) and does not pass through the scrambler unit (202). If the data does not pass the checks the data is discarded.

It is also possible to place a second scrambler unit (not shown) between the host logic (203) and the second system (205). In such an arrangement protection is symmetrical in that the content Checker is protected against flaws in the host logic triggered by data passing in either direction.

For convenience it is possible to modify the arrangement further so that data from the second system destined for the first system is scrambled by a second scrambler unit and unscrambled by a second descrambler unit. The advantage is that two scrambler and de-scrambler units can be combined to produce a single device that can be placed in either position.

Figure 3:
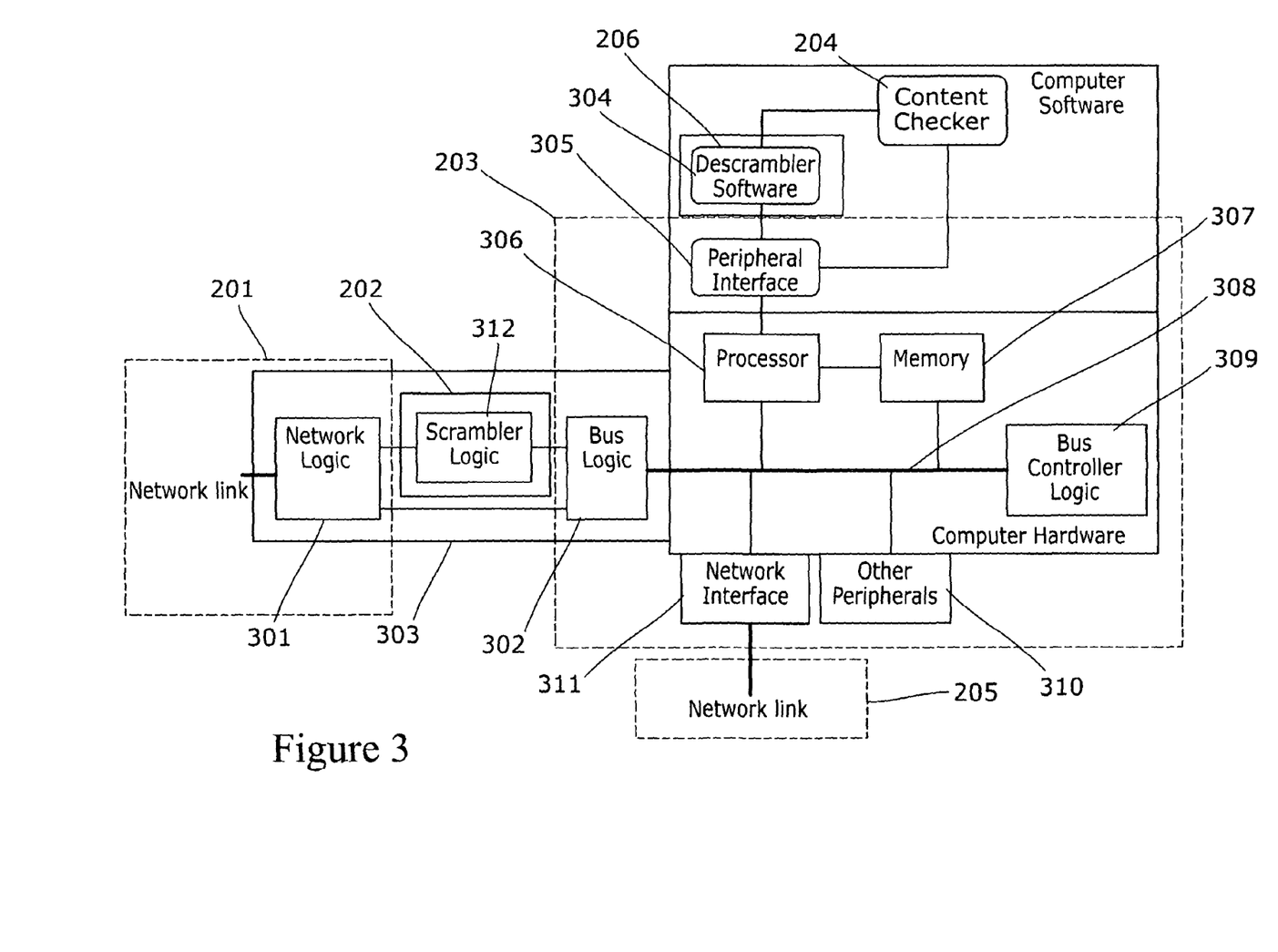
FIG. 3 shows a schematic diagram of a third firewall system in accordance with the present invention.
Figure 4:
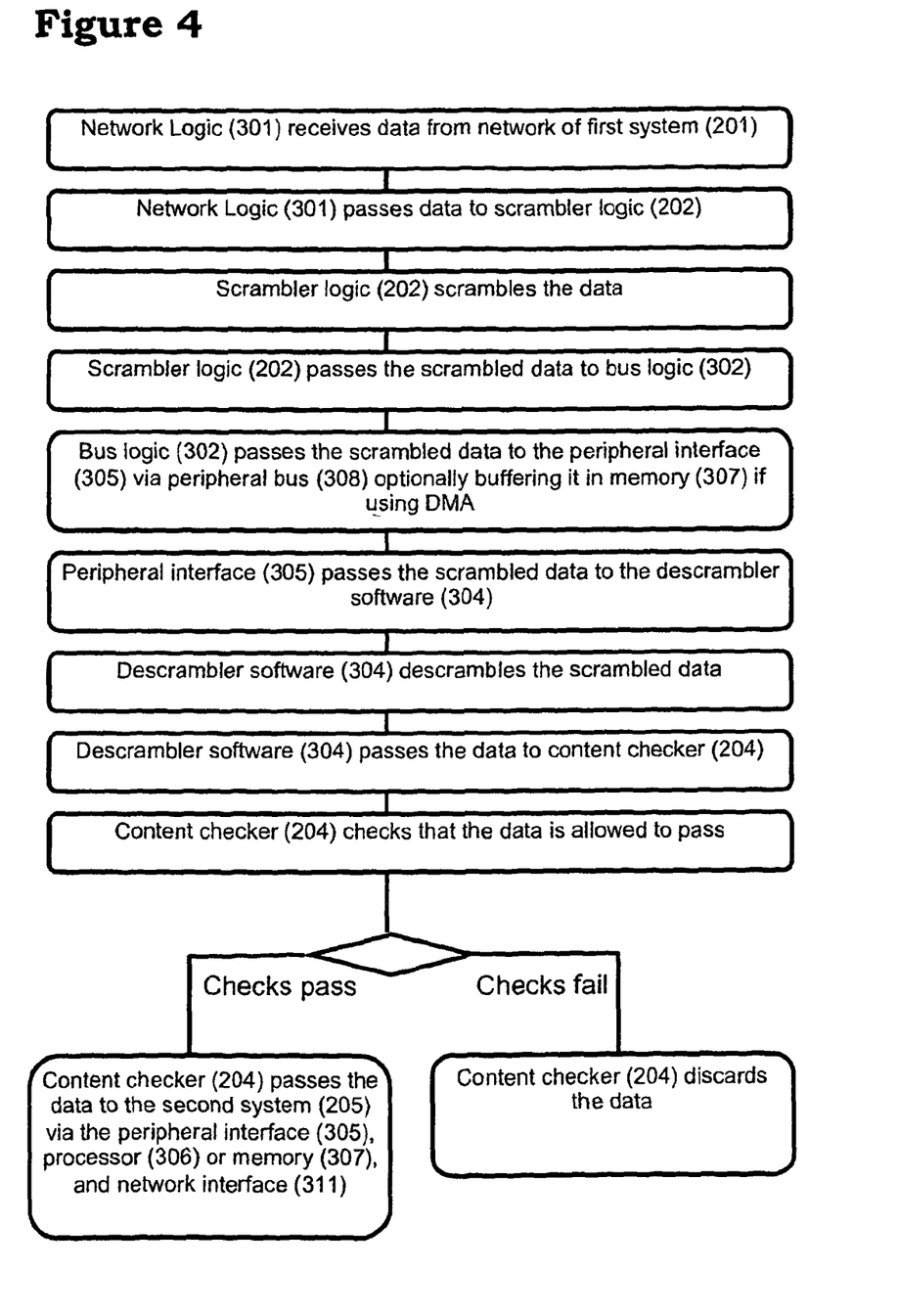
FIG. 4 shows a schematic diagram of a first method in accordance with the present invention.
Figure 5:
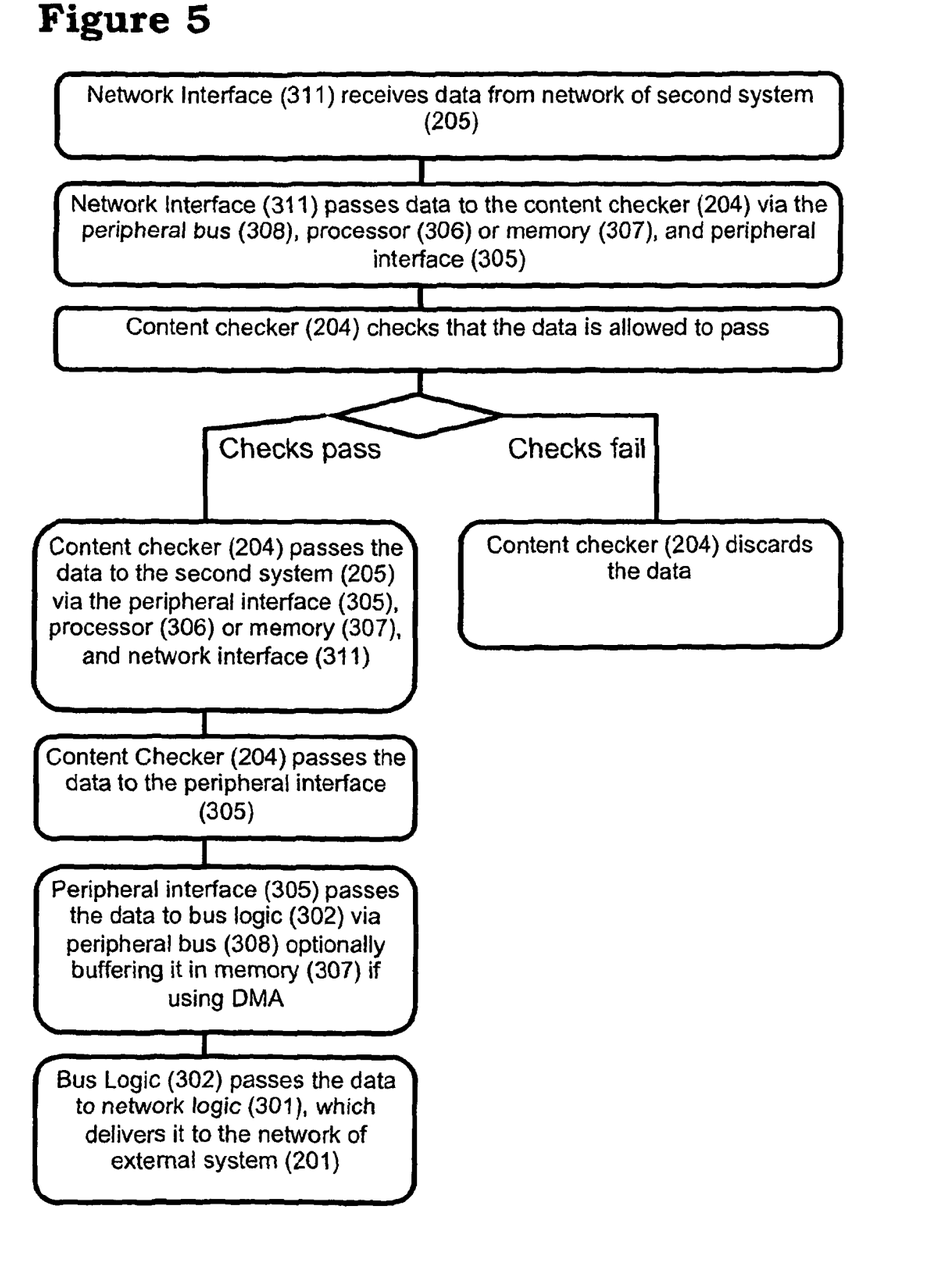
FIG. 5 shows a schematic diagram of a second method in accordance with the present invention.

Referring now to FIGS. 3, 4, and 5, the function of the scrambler unit (202) is provided by scrambler logic (312) which is built into a Network Interface Card (MC) (303). The NIC contains network logic (301) that Interfaces to a network that joins it to the external system (201). It also contains bus logic (302) that connects to the peripheral bus (308) of a computer that hosts the content checker (204).

The peripheral bus of the computer that hosts the content checker is controlled by some bus controller logic (309). One peripheral is a network interface card (311) that Inks the computer to the second system (205). Further peripherals, such as disks, video displays and other network interface cards are attached to the peripheral bus. These are shown together as "other peripherals" (310) in the diagram.

The computer's processor (306) and main memory units (307) are also connected to the peripheral bus (308), allowing the processor to interact with peripherals directly of via the well-known technique of direct memory access (DMA).

The computers software includes peripheral interface software (305) for controlling the scrambler NIC. This device driver software acts as an Interface between the descrambler software (304) and the scrambler MC peripheral (303). The descrambler software (304) implements the function of the descrambler unit (206) by unscrambling data received from the scrambler NIC (303).

The scrambler logic (312) takes data from the network logic (301), scrambles it and passes it to the bus logic (302) for onward delivery to the content checker (204) via the descrambler software (304). Data passing from the content checker (204) to the first system (201) does not pass through the descrambler software (312).

FIG. 4 illustrates how data passing from the first external system (201) to the second external system (205) may be handled under normal operating conditions.

FIG. 5 illustrates how data passing from the second external system (205) to the first external system (201) may be handled under normal operating conditions.

Different behaviour arises in each case if a malfunction occurs in the Host Logic (203)—that is the following components: Bus Logic (302), Peripheral Interface (305), Processor (306), Memory (307), Peripheral Bus (308), Bus Controller Logic (309), Other Peripherals (310) and Network Interface (311).

Note that the data is scrambled by the scrambler logic (312) before it reaches host logic (203). Such a malfunction could cause the scrambled data to be discarded by the host logic, in which case no damage to the second external system (205) would result. Alternatively the malfunction may cause the scrambled data to be delivered to the content checker (204), in which case the content checker will find it unintelligible and discard it. As a further alternative the malfunction may cause the scrambled data to be delivered to the second external system (205). This system will also find the data unintelligible and discard it. Any construct in the data that would normally cause a malfunction in the content checker or second external system is scrambled as so rendered inoperative.

In this embodiment, data passing between the content checker (204) and the second external system (205) does not pass through the descrambler software and crosses the peripheral bus in the usual way that is well known to computer system engineers and is not described in detail here.

In an alternative embodiment, data passing from Content Checker (204) to the first system (201) may pass through additional scrambler software and thus be scrambled as it crosses the peripheral bus (308). In such an embodiment, data passing from the Bus Logic (302) to the Network Logic (301) would pass through additional descrambler logic in order to be unscrambled.

In a further possible embodiment, a second scrambler NIC could be used to connect to the second external network in place of Network Interface (311) as would be apparent to the skilled person The scrambling algorithm should ideally ensure that an attacker cannot predict how the data will be scrambled. This can be achieved by generating a random value, known to both the scrambling logic and the scrambler software, and applying an exclusive OR (XOR) operation to the data using this value. The exclusive OR operation is well known to be a readily reversible means of scrambling data. Applying the operation to data scrambles it and applying the operation to scrambled data, using the same random value, unscrambles it.

The scrambler logic and scrambler software must share the same random value. This can be generated by one and passed to the other across the peripheral bus. While this does mean another peripheral can learn the random value, by passively observing data crossing the bus to which it is connected, this would not be normal behaviour. If another peripheral did learn the random value in this way, it could then use it to unscramble the scrambled data, allowing it to bypass the checkers. However, it is highly unlikely that a peripheral will both observe the random value and apply the unscrambling function as a result of a single malfunction. A peripheral could however do this as part of a planned attack, whereby the attacker places such logic into a peripheral that is then placed into the critical checker computer.

Although it is highly unlikely that a malfunction would cause a peripheral to observe the random value crossing the peripheral bus when it is first setup, use of well-known techniques for cryptographic key establishment could be used instead to reduce the likelihood still further. For example, the scrambler logic and scrambler software could use the Diffie-Hellman algorithm. This allows them to agree a random value without that value being passed across the peripheral bus.

The use of the XOR function with a random value is a simple form of encryption. However, it would also be possible to use the value as a cryptographic key and apply any cryptographic algorithm to the data. There are many well-known algorithms that could be used. A symmetric algorithm, such as AES, could be used with scrambling corresponding to using the random value as a key to encrypt data and unscrambling corresponding to using it as a key to decrypt data.

The advantage of using the random value as an encryption key over XOR is that if the same data is sent repeatedly it will be scrambled differently each time, which prevents an attacker simply taking some attack data and XOR-ing it with each possible random value repeatedly in order to search for the random value in use.

As an alternative to symmetric encryption algorithms an asymmetric algorithm could be employed. This requires two related random values to operate—one is used to encrypt the data and the other to decrypt it. The advantage of an asymmetric algorithm is that the different key pairs could be used to scramble the data in each direction and the sending component can be given the scrambling key by the receiving component. This means the scrambling key is visible to another peripheral but the unscrambling key is not, since it does not pass across the peripheral bus. This means a malfunction of the other peripheral cannot result in it observing the information needed to unscramble any data it receives in error.

A computer may have two scrambler NICs installed to protect the Content Checker from attacks launched from one of two networks. In this configuration, the NIC may be pre-loaded with a cryptographic identity, such as an X.509 certificate and corresponding private key. The device driver may employ a handshaking algorithm such as that used for Secure Sockets Layer (SSL) to ensure that where a scrambling key is negotiated, the two parties authenticate each other so the exchange of data is guaranteed to be with the expected NIC, and not the other one. This ensures that data flows along expected paths, and so the appropriate checks can be applied to the data according to the direction the data is flowing (i.e. inbound checks on inbound data and outbound checks on outbound data).

In practice, peripherals connected to a computer's peripheral bus can access the computer's main memory directly. Computers support this to allow peripherals to transfer data at high speed into the computer's main memory without processor involvement. As a result, a peripheral could observe the memory and discover the random value used by the device driver. However, it is not considered feasible that this could happen as the result of a malfunction, only as the result of an active attack embedded in the peripheral.

With the data being scrambled as it passes across the peripheral bus, it is extremely unlikely that malfunctions of other peripherals will cause them to obtain unscrambled payload data from the bus.

However, as data is received and unscrambled by the BreakWall device driver it will typically be buffered in the computer's memory until a complete package of data is received and then passed to the software content checkers for checking. While the data is buffered in memory, other peripherals could observe it using the direct memory access facility of the peripheral bus. A malfunction of a peripheral could therefore cause buffered data to be transferred onwards without checking.

The possibility of such a malfunction is remote, but storing the buffered data in scrambled form can reduce it still further. The difficulty here is that the data frames received from the network link comprise header information as well as payload data. The header information, which includes information such as channel identifiers and sequence numbers, must be unscrambled by the driver in order that it can assemble the complete package of data to be checked from the fragments received in the frames. However, it is possible for the driver to leave the payload data in a scrambled form until it is ready for checking.

The scrambling technique can also be employed between the NIC and the software content checker. This requires a second random value or key to be shared between the (Break-Wall) NIC and the software content checker. The first random value or key is used to protect frame header information from being interpreted by other peripherals, while the second one is used to protect the payload data contained in the frames, which fit together to form the overall package of data that is to be checked.

The invention claimed is:

1. A method of content checking of data transmitted between a first and a second separate computer system wherein the first and second computer systems are linked by a content checker, the method comprising:
   receiving, by a network interface card supporting the content checker, data that has been transmitted from the first computer system;
   encrypting, by the network interface card supporting the content checker, the received data and passing the encrypted data to logic supporting the content checker, the logic supporting the content checker directing the encrypted data to a decryption unit;
   decrypting, by the decryption unit, the encrypted data and passing the decrypted data to the content checker; and
   checking the decrypted data at the content checker to ensure it meets predetermined conditions prior to causing said decrypted data to be passed to the second system if it meets the predetermined conditions.

2. A method according to claim 1 in which the encryption method employs a key agreement protocol to establish encryption key values.

3. A method according to claim 2 in which the key agreement protocol is chosen such that even if the protocol messages are observed they cannot be used to determine the key.

4. A method according to claim 3 in which the key agreement protocol uses a Diffie-Hellman algorithm.

5. A method according to claim 1 in which the encryption method uses a symmetric encryption method.

6. A method according to claim 1 in which the encryption method uses XOR encryption.

7. A method according to claim 1 in which the encryption method uses an asymmetric encryption method.

8. A method according to claim 1 in which content checking is applied to data transmitted in both directions.

9. A method according to claim 8 in which distinct cryptographic keys are used for the two directions of transmission.

10. A method according to claim 8 in which cryptographic methods are employed for the two directions of transmission.

11. A method according to claim 1 in which the asymmetric key pair is generated in one of the network interface card and a device driver for the content checker and the scrambling key forwarded to the other of the network interface card and the device driver for the content checker whilst retaining the other as the unscrambling key.

12. A method according to claim 1 in which at least one of the network interface card and the device driver for the content checker is loaded with a cryptographic identity for use in authenticating a shared encryption key.

13. A non-transitory computer readable medium storing a program for causing at least one computer to perform a method comprising the steps of:
   receiving data that has been transmitted from a first computer system at a network interface card supporting a content checker;
   the network interface card supporting the content checker encrypting the received data and passing the encrypted data to logic supporting the content checker, the logic supporting the content checker directing the encrypted data to a decryption unit;
   decrypting the encrypted data with the decryption unit and passing the decrypted data to the content checker; and
   checking the decrypted data at the content checker to ensure it meets predetermined conditions prior to causing said decrypted data to be passed to the second system if it meets the predetermined conditions.

* * * * *